United States Patent
Hurst

[11] Patent Number: 5,828,366
[45] Date of Patent: Oct. 27, 1998

[54] NON-LINEAR INTERLINE FLICKER REDUCER

[75] Inventor: Robert Norman Hurst, Mercer, N.J.

[73] Assignee: Sarnoff Corporation, Princeton, N.J.

[21] Appl. No.: 527,037

[22] Filed: Sep. 12, 1995

[51] Int. Cl.[6] ................................................. G09G 5/00
[52] U.S. Cl. ............................................. 345/204; 348/910
[58] Field of Search .................................... 345/200, 204, 345/208, 213, 214, 150; 348/910, 607, 622, 623, 618

[56] References Cited

U.S. PATENT DOCUMENTS

| | | | |
|---|---|---|---|
| 4,015,076 | 3/1977 | Ishiodori | 348/623 |
| 4,961,113 | 10/1990 | Okada et al. | 348/623 |
| 4,962,426 | 10/1990 | Naoi et al. | 348/623 |
| 5,136,385 | 8/1992 | Campbell | 348/607 |

*Primary Examiner*—Matthew Luu
*Attorney, Agent, or Firm*—William J. Burke

[57] ABSTRACT

An apparatus and method for improving the display of progressively scanned images on displays that employ an interlace display technique. The apparatus comprises a vertical filter and a clipper. An input image is vertically low-pass and high-pass filtered through the vertical filter. The resulting high-pass signal is passed through the clipper such that a non-linear transfer function limits the maximum value that is permitted to pass through the clipper. The "clipped" high-pass signal is then recombined with the low-pass signal to reconstruct a flicker-reduced image. In this fashion, interline flicker is reduced while maintaining the full resolution of natural images.

20 Claims, 1 Drawing Sheet

NON-LINEAR INTERLINE FLICKER REDUCER

The present invention relates to an apparatus and method for improving signal processing. More particularly, this invention improves the display of progressively scanned images on displays that employ interlace display techniques.

BACKGROUND OF THE INVENTION

Generally, a computer employs a progressive scanning technique for the display of computer graphic-type images. Namely, the entire image is displayed in a single scan starting from the top of the image down to the bottom of the image.

In contrast, a conventional television display employs an interlace display technique, a form of subsampling, where every other line of an image is initially scanned. Once the initial scan is completed, a second scan of the remaining set of lines is conducted starting from the top of the image. Namely, the odd numbered lines of an image is initially scanned, followed by a succeeding scan of the even numbered lines at a later time. Generally, subsampling excludes samples representing the data, thereby reducing the size of the image. For example, in subsampling by a factor of two, every other sample is excluded, thereby halving the number of samples representing the data. However, a large sampling interval may cause severe aliasing effects due to the insufficient number of samples.

A problem arises when computer graphic-type images are displayed using the conventional interlace display technique. A flickering of the displayed image is detected and is especially pronounced when alternating lines of the image possess strong contrast (i.e. the "Venetian blind" effect where successive lines are black/white/black/white . . . ). This problem arises from the use of a subsampling technique in the conversion of a progressively scanned image for an interlace scan display.

To illustrate, if subsampling is performed on a progressively scanned Venetian blind type image, then the black lines are stored in one scan while the white lines are stored in a second scan, thereby causing the contrasting lines to be stored in different fields. Thus, the first field is white while the second field is black. As these fields are displayed in time, a noticeable flicker is observed on the television display.

Traditionally, a common technique for minimizing this flicker applies a low-pass filter to the images (i.e. convolve the image with a low-pass filter kernel). The low pass filter takes a weighted average of two or more samples and effectively removes high spatial frequencies. This vertical spatial filtering effectively reduces the contrast between adjacent lines in the images. Although this technique is effective in minimizing the flickering, the technique causes the images to be "soft". This resulting distortion on computer graphic-type images is generally acceptable, but is pronounced in natural images. Line-to-line changes in a natural image play an important role in the subjective sharpness of the natural image. Since natural images tend to possess an inverse relationship between spatial frequency and energy, line-to-line changes in natural images tend to be small. Furthermore, small line-to-line changes do not contribute significantly to the perception of interline flicker. By applying the traditional filtering technique to a natural image, a significant degradation in the resolution (sharpness) of the natural image is detected. Thus, when natural images and computer graphics are displayed simultaneously, the technique minimizes the flickering at the cost of reducing the resolution of the natural images.

Therefore, a need exists in the art for an apparatus that minimizes the effect of flickering and yet maintains the resolution of images when displaying computer graphic and natural images simultaneously on a display that employs an interlace display technique.

SUMMARY OF THE INVENTION

The apparatus of the present invention comprises a vertical filter and a clipper. The input signal (image) is vertically low-pass and high-pass filtered. The resulting high-pass signal is passed through the clipper such that a non-linear transfer function limits the maximum value that is permitted through the clipper. The "clipped" high-pass signal is then recombined with the low-pass signal to reconstruct the image. In this fashion, the apparatus does not affect small vertical changes between adjacent lines, thereby maintaining the full resolution of natural images. At the same time, the apparatus reduces the flicker associated with Venetian blind type computer graphics.

BRIEF DESCRIPTION OF THE DRAWINGS

The teachings of the present invention can be readily understood by considering the following detailed description in conjunction with the accompanying drawing, in which.

DETAILED DESCRIPTION

Figure 1:
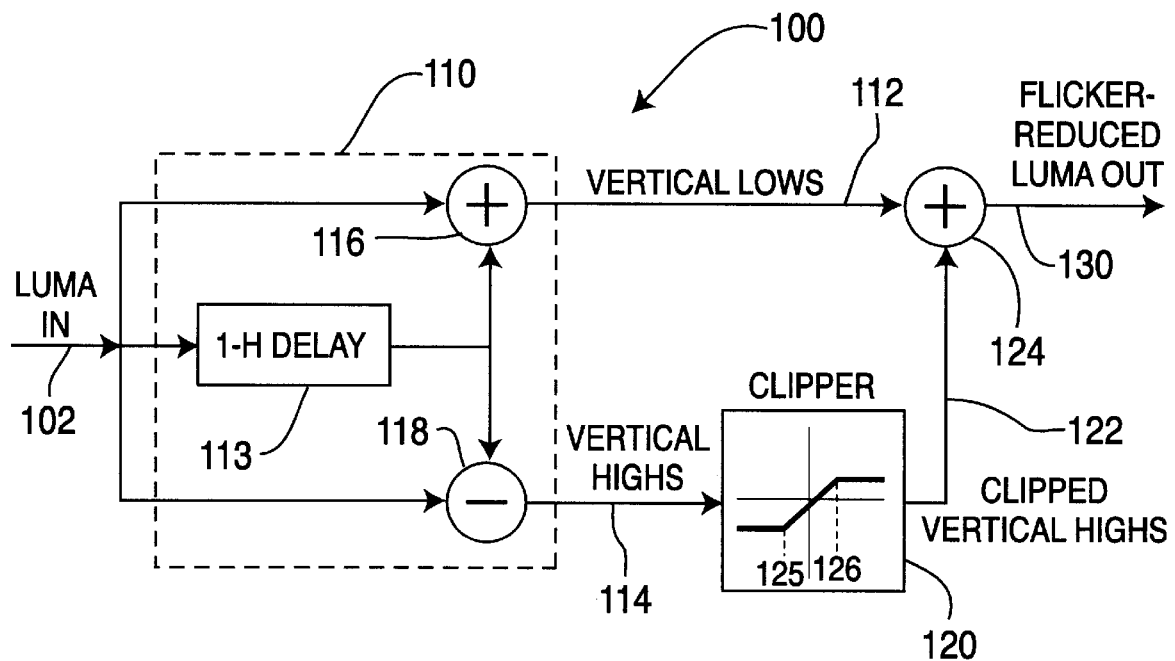
FIG. 1 illustrates a block diagram of the circuitry of the apparatus of the present invention.

FIG. 1 depicts a block diagram of the circuitry of the apparatus of the present invention for performing signal processing. The apparatus 100 of the present invention comprises a spatial vertically oriented filter 110 and a clipper 120. The vertical filter 110 comprises a delay portion 113, a summation portion 116 and a difference portion 118. An input signal "Luma In" (luminance signal) 102 is vertically low-pass and high-pass filtered through the vertically oriented filter 110 to produce a low-pass signal 112 and a high-pass signal 114. However, those skilled in the art will realize that the vertically oriented filter 110 can be implemented through the use of two separate filters, a low-pass filter and a high pass filter.

The resulting high-pass signal 114 is passed through the clipper 120 which employs a non-linear transfer function to limit the absolute maximum value that is permitted to pass through the clipper 120. In the preferred embodiment, the non-linear transfer function possesses a window transformation having a width of the linear slope, 126–125 (as illustrated in FIG. 1). Input values falling within the window of the transfer function are passed through the clipper 120 without modification, while input values falling without the window are clipped to the absolute maximum limits of the clipper.

For example, if successive samples of an input signal possess strong contrast as in the case of a Venetian blind computer graphic-type image, the high-pass signal 114 are "clipped" to the maximum value limited by the clipper 120. Conversely, if successive samples of an input signal possess weak contrast as in the case of a natural image, the high-pass signal 114 simply passes through the clipper 120 without being altered. In this fashion, small vertical changes between adjacent lines are not affected, thereby maintaining the full resolution of natural images. Thus, the clipper 120 serves to distinguish and modify flicker-causing portions of an input image.

Figure 2A:
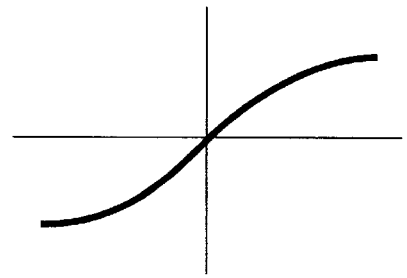
FIG. 2a illustrates a non-linear sigmoidal function.
Figure 2B:
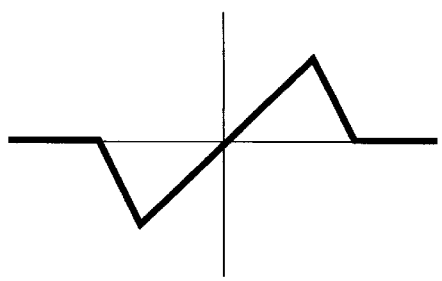
FIG. 2b illustrates a non-linear Z-function.
Figure 2C:
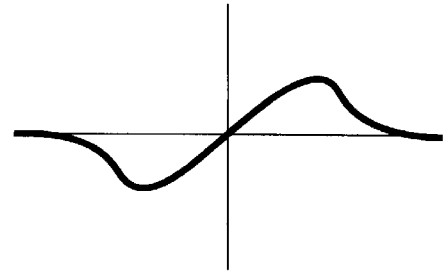
FIG. 2c illustrates a non-linear smooth Z-function.

Alternatively, the clipper 120 may employ a number of different non-linear transfer functions which are anti-symmetric around zero and provide a reduction of the absolute value of certain input values. Specifically, the reduction of input values whose absolute value is substantially greater than zero is preferred. FIGS. 2a–2c illustrate three other suitable types of transfer functions for reducing such input values. FIG. 2a illustrates a sigmoidal (S-shaped) function which reduces the input values but permits the maximum value to gradually rise. The sigmoidal function resembles the mu-law function which is used in some telephone voice digitizers.

FIGS. 2b–2c illustrate a class of functions which is commonly known as "Z-functions". Unlike the clipper 120 in the preferred embodiment, which maintains a constant absolute (maximum) output level, a clipper with a Z-function actually lowers the absolute output as the input signal rises. One advantage of the Z-function is its ability to totally eliminate interline flickering for very large changes as opposed to the preferred embodiment which simply limits interline flickering to some acceptable maximum value. However, the total elimination of interline flickering introduces a significant amount of distortion and the resulting image may exhibit unacceptable aliasing artifacts. In addition, the implementation of a Z-function clipper is generally more complex. Thus, the selection of a suitable transfer function depends upon the application and the level of acceptable distortion.

Finally, the clipped high-pass signal 122 is then recombined with the low-pass signal 112 via a summation portion 124 to reconstruct a flicker-reduced output signal 130 "Luma Out". If an image (natural or computer graphic) is passed through the clipper 120 without alteration, the reconstructed output signal 130 simply reflects the original input signal. This result reflects the canceling effect of combining a low-pass signal with a high-pass signal to arrive at the original unfiltered signal.

However, if an image (natural or computer graphic) is modified by the clipper 120, the reconstructed output signal 130 reflects a flicker-reduced version of the original input signal. Since the process of clipping high input values results in a softer image (or portions of an image), the resulting output signal 130 can be displayed on an interlace scan display with minimal flickering.

Since it is often difficult to anticipate which portions of an image will cause flickering, the apparatus of the present invention, in effect, selectively applies low-pass filtering to portions of an image that possess high interline contrast. In this manner, small vertical changes are not affected as in natural images and full resolution is maintained, while large vertical transitions as found in Venetian blind computer graphic images, are limited to prevent objectionable flickering.

In another embodiment of the present invention, color difference signals such as Cyan, Magenta, Yellow (CMY) or Red, Green, Blue (RGB) signals are used as input signals to the current apparatus. In similar fashion, the apparatus 100 serves to selectively remove high interline contrast in these signals.

There has thus been shown and described a novel apparatus and method that improves the display of progressively scanned images on displays that employ an interlace display technique. Many changes, modifications, variations and other uses and applications of the subject invention will, however, become apparent to those skilled in the art after considering this specification and the accompanying drawings which disclose the embodiments thereof. All such changes, modifications, variations and other uses and applications which do not depart from the spirit and scope of the invention are deemed to be covered by the invention, which is to be limited only by the claims which follow.

What is claimed is:

1. An apparatus for improving the display of images on a display that employs an interlace display technique, said apparatus comprising:
    a filtering means for filtering an input signal into a low-pass signal and a high-pass signal;
    a clipping means, coupled to said filtering means, for limiting said high-pass signal in accordance with a predetermined maximum value, resulting in a clipped high-pass signal; and
    a summing means, coupled to said filtering means and said clipping means, for combining said low-pass signal with said clipped high-pass signal to produce a flicker reduced output signal.

2. The apparatus of claim 1, wherein said input signal is a progressively scanned image.

3. The apparatus of claim 2, wherein said progressively scanned image comprises a computer graphic-type image.

4. The apparatus of claim 3, wherein said progressively scanned image further comprises a natural image.

5. The apparatus of claim 1, wherein said input signal is a color difference signal.

6. The apparatus of claim 1, wherein said input signal is a color signal.

7. The apparatus of claim 1, wherein said input signal is a luminance signal.

8. The apparatus of claim 1, wherein said predetermined value is calculated in accordance with a non-linear transfer function.

9. The apparatus of claim 8, wherein said non-linear transfer function contains a window transformation having a linear slope.

10. The apparatus of claim 8, wherein said non-linear transfer function is a sigmoidal function.

11. The apparatus of claim 8, wherein said non-linear transfer function is a Z-function.

12. A method for improving the display of images on a display that employs an interlace display technique, said method comprising the steps of:
    filtering an input signal into a low-pass signal and a high-pass signal;
    limiting said high-pass signal in accordance with a predetermined maximum value, resulting in a clipped high-pass signal; and
    combining said low-pass signal with said clipped high-pass signal to produce a flicker reduced output signal.

13. The method of claim 12, wherein said input signal is a progressively scanned image.

14. The method of claim 13, wherein said progressively scanned image comprises a computer graphic-type image.

15. The method of claim 14, wherein said progressively scanned image further comprises a natural image.

16. The method of claim 12, wherein said input signal is a color signal.

17. The method of claim 12, wherein said input signal is a luminance signal.

18. The method of claim 12, wherein said predetermined value is calculated in accordance with a non-linear transfer function.

19. The method of claim 18, wherein said non-linear transfer function is a sigmoidal function.

20. The method of claim 18, wherein said non-linear transfer function is a Z-function.

\* \* \* \* \*